US012521043B2

(12) United States Patent
Jeong et al.

(10) Patent No.: US 12,521,043 B2
(45) Date of Patent: Jan. 13, 2026

(54) SENSOR UNIT FOR CONTINUOUS BLOOD GLUCOSE MEASUREMENT (71) Applicant: I-SENS, INC., Seoul (KR)

(72) Inventors: In Seok Jeong, Seoul (KR); Su Min Gwak, Seoul (KR); Hee Jung Kwon, Seoul (KR); Se Yong Choi, Seoul (KR); Young Jea Kang, Seoul (KR)

(73) Assignee: I-SENS, INC., Seoul (KR)

( * ) Notice: Subject to any disclaimer, the term of this patent is extended or adjusted under 35 U.S.C. 154(b) by 823 days.

(21) Appl. No.: 17/628,561

(22) PCT Filed: Mar. 13, 2020

(86) PCT No.: PCT/KR2020/003521
§ 371 (c)(1),
(2) Date: Jan. 19, 2022

(87) PCT Pub. No.: WO2021/033863
PCT Pub. Date: Feb. 25, 2021

(65) Prior Publication Data
US 2022/0257153 A1 Aug. 18, 2022

(30) Foreign Application Priority Data
Aug. 19, 2019 (KR) .......................... 10-2019-0101000

(51) Int. Cl.
*A61B 5/145* (2006.01)
*A61B 5/1473* (2006.01)
*A61B 5/1486* (2006.01)

(52) U.S. Cl.
CPC ...... *A61B 5/14532* (2013.01); *A61B 5/14503* (2013.01); *A61B 5/1473* (2013.01); *A61B 5/14865* (2013.01); *A61B 2562/0209* (2013.01)

(58) Field of Classification Search
CPC ............ A61B 5/14532; A61B 5/14503; A61B 5/1473; A61B 5/14865; A61B 2562/0209;
(Continued)

(56) References Cited

U.S. PATENT DOCUMENTS

2004/0167801 A1 8/2004 Say et al.
2010/0198034 A1 8/2010 Thomas et al.
(Continued)

FOREIGN PATENT DOCUMENTS

CN 105232058 1/2016
EP 3 406 193 11/2018
(Continued)

OTHER PUBLICATIONS

Examination Report No. 1 dated Feb. 2, 2023 for Australian Patent Application No. 2020334509.
(Continued)

*Primary Examiner* — Tse W Chen
*Assistant Examiner* — Joseph A Tombers
(74) *Attorney, Agent, or Firm* — WOMBLE BOND DICKINSON (US) LLP (57) ABSTRACT The present disclosure relates to a continuous blood sugar measuring sensor member, wherein: since an electrode layer formed on one surface of a substrate is connected to a sensor contact point part on the other surface of the substrate through a via hole and thus two electrode layers may be formed on different opposite surfaces without having to be formed on the same surface of the substrate, the width of the substrate may be further reduced and an overall minimized and simplified structure may be ensured; since an electrode connection layer formed at the via hole is not formed in a shape of filling the via hole but is formed only on the inner circumferential surface, a filling defect occurring in a process of filling the via hole and a fault in electrical connection
(Continued)

according thereto may be prevented and thus a more stable structure may be ensured; and since a plurality of via holes are formed, despite damage to or the occurrence of a defect in an electrode connection layer formed at one of the via holes, electrical connection is maintained by electrode connection layers formed at the remaining via holes, and thus more stable performance may be maintained.

7 Claims, 9 Drawing Sheets

(58) Field of Classification Search
CPC .............. A61B 5/14514; A61B 5/7225; A61B 2562/16; A61B 5/24
See application file for complete search history.

(56) References Cited

U.S. PATENT DOCUMENTS

| | | |
|---|---|---|
| 2013/0267809 A1 | 10/2013 | Brister et al. |
| 2015/0005601 A1 | 1/2015 | Hoss et al. |
| 2016/0058344 A1 | 3/2016 | Peterson et al. |
| 2017/0128011 A1 | 5/2017 | Frey et al. |
| 2017/0290546 A1 | 10/2017 | Antonio et al. |
| 2018/0146894 A1 | 5/2018 | Kwon et al. |
| 2018/0325432 A1 | 11/2018 | Harttig |

FOREIGN PATENT DOCUMENTS

| | | |
|---|---|---|
| JP | 2017-073424 | 4/2017 |
| JP | 2018-057726 | 4/2018 |
| JP | 6532925 | 6/2019 |
| KR | 10-2018-0127729 | 11/2018 |
| WO | 2018/118061 | 6/2018 |

OTHER PUBLICATIONS

Office Action dated Dec. 6, 2022 for Japanese Patent Application No. 2022-505477 and its English translation from Global Dossier.
International Preliminary Report on Patentability (Chapter I) issued on Feb. 17, 2022 for PCT Patent Application No. PCT/KR2020/003521 (now published as WO 2021/033863).
Examination Report 2 dated May 28, 2024 for New Zealand Patent Application No. 784079.
Eurocircuits: "What is a via hole in PCB", Mar. 15, 2015, retrieved from Internet on May 27, 2024. Retrieved from <https://www.eurocircuits.com/via-via-hole/>, pp. 1-2.
European Search Report dated May 23, 2023 for European Patent Application No. 20855167.1.
International Search Report for PCT/KR2020/003521 mailed on Jun. 22, 2020 and its English translation from WIPO (now published as WO 2021/033863).
Written Opinion of the International Searching Authority for PCT/KR2020/003521 mailed on Jun. 22, 2020 and its English translation by Google Translate (now published as WO 2021/033863).
Notice of Allowance dated Jul. 20, 2021 for Korean Patent Application No. 10-2019-0101000 and its English translation from Global Dossier.
Office Action dated Dec. 11, 2020 for Korean Patent Application No. 10-2019-0101000 and its English translation from Global Dossier.
Office Action dated May 20, 2025 for Japanese Patent Application No. 2024-020829 and its English translation provided by Applicant's foreign counsel.

SENSOR UNIT FOR CONTINUOUS BLOOD GLUCOSE MEASUREMENT

CROSS-REFERENCE TO RELATED APPLICATIONS

The present application is the U.S. National Phase of PCT Application No. PCT/KR2020/003521 filed on Mar. 13, 2020, which claims the priority to Korean Patent Application No. 10-2019-0101000 filed on Aug. 19, 2019, the entire contents of which are incorporated herein by reference.

TECHNICAL FIELD

The present disclosure is related to a sensor unit for continuous blood glucose measurement. In more detail, a sensor unit for continuous blood glucose measurement connects an electrode layer formed on one surface of a circuit board with a sensor contact point portion of the other surface of the circuit board through one or more via holes, thereby more reducing the width of the circuit board and providing an overall minimized and simplified structure by arranging two electrode layers on one and the other surfaces of the circuit board opposite to each other, respectively, without necessity of arranging two electrode layers on the same surface of the circuit board; forms an electrode connection layer formed at the via holes by depositing the electrode connection layer on an inside circumferential surface of the via holes instead of a structure of filling an electrode connection layer to the via holes, thereby preventing defection of filler caused during the process of filling the via holes and faulty of electrical connection due to this so as to achieve a more stable structure; and forms a plurality of via holes so that, even though any one of the electrode connection layers formed at the via holes is damaged or faulty, the electrical connection can be maintained by the electrode connection layers formed on the remaining via holes, thereby maintaining more stable performance.

BACKGROUND

Diabetes is a chronic medical condition that is common in modern people, and in the Republic of Korea, there are 2 million diabetes patients, about 5% of the total population.

Diabetes occurs when the absolute level of the sugar level in blood is high due to the absolute deficiency or relative insufficiency of insulin, produced by the pancreas, caused by various reasons such as obesity, stress, poor eating habits, and inherited hereditary factors and imbalance regarding glucose in the blood.

The blood usually contains a certain concentration of glucose, and tissue cells gain energy from the glucose.

However, when the glucose is increased excessively more than needed, the glucose cannot be properly stored in the liver, muscle, or adipose tissue and is accumulated in the blood, because of this, patients with diabetes maintain a much higher blood glucose level than normal people, and as excessive blood glucose passes through the tissues and is discharged into the urine, it results in deficiency of glucose, which is absolutely necessary for all tissues of the body, thereby causing abnormalities in respective body tissues.

Diabetes is characterized by substantial absence of subjective symptoms at the beginning of the condition, when diabetes progresses, diabetes-specific symptoms such as overdrink, overeat, polyuria, weight loss, weariness, skin itchiness, and lower ability of naturally healing on injury on hands and feet are shown, and further progression of diabetes leads to complications such as visual disturbances, hypertension, kidney disease, paralysis, periodontal disease, muscle spasms and neuralgia, as well as gangrene.

In order to diagnose diabetes beforehand and manage to prevent the progression of diabetes into complications associated therewith, systematic blood glucose measurement and treatment should be performed.

For diabetes patients as well as people having higher than normal blood glucose, even though diabetes has not yet developed, medical device manufacturers offer a variety of blood glucose meters to measure blood glucose levels at home.

Glucose measuring devices may be categorized into a single time measurement type measuring a blood glucose level and collecting blood from a fingertip by a user every single time and a continuous measurement type attaching a glucose monitoring system to the belly or an arm of the user and continuously measuring blood glucose levels.

Diabetics patients generally experience hyperglycemia and hypoglycemia, an emergency may occur in the hypoglycemic conditions, and the patients may become unconscious or die if a hypoglycemic condition lasts for an extended period of time without the supply of sugar. Accordingly, although rapid discovery of the hypoglycemic condition is critically important for diabetics, blood-collecting type glucose monitoring devices intermittently measuring glucose have limited ability to accurately measure blood glucose levels.

Recently, to overcome such a drawback, continuous glucose monitoring systems (CGMSs) inserted into the human body to measure a blood glucose level every few minutes have been developed, and therefore easily perform the management of diabetics and responses to an emergency situation.

Additionally, the blood-collecting glucose monitoring system performs the glucose measurement by collecting blood by pricking a pain-sensitive fingertip with a needle by the diabetes patients themselves, and therefore, the blood collecting process may cause pain and aversion. To minimize such pain and aversion, research and development regarding the CGMSs, which can continuously measure glucose levels by inserting a needle-shaped sensor into a portion of the human body, such as the belly or an arm, which is less pain sensitive, have been undertaken, and furthermore, research and development of non-invasive glucose monitoring systems for measuring glucose without collecting blood have been actively undertaken.

Over the past 40 years, non-invasive glucose monitoring systems have been studied regarding various methods of measuring glucose without collecting blood, for example, optical methods, electrical methods, exhalation measurement methods, and the like. Cygnus Corporation, Redwoo City, Calif., U.S.A, has developed and launched the Glucowatch® G2 Biographer, a wrist watch type, using reverse iontophoresis, but the sales of this product were stopped in 2007, because of many problems, such as skin stimulation issues and qualification approval issues, malfunction caused by sweating, and low reliability in measurement of hypoglycemia comparing with hyperglycemia. Although a variety of non-invasive glucose monitoring techniques have been introduced and reported to date, there have been no practical uses due to low reliability or accuracy.

A continuous glucose monitoring system includes a sensor module attached to the skin of the human body and measuring a blood glucose level by extracting body fluid, a transmitter transmitting the blood glucose level measured by the sensor module to a terminal, the terminal outputting the received blood glucose level, and any other appropriate component. The sensor module includes a needle-shaped sensor probe for insertion into subcutaneous fat to extract interstitial fluid and any other appropriate component. A separate applicator for attaching the sensor module to the body is used.

Those continuous glucose monitoring systems are manufactured to have a wide variety of types depending on their manufacturers, and are used in a variety of methods. However, the most of the continuous glucose monitoring systems are manufactured and distributed as a type that a one-time use sensor module is attached to the human body using an applicator, and an adhesive tape is attached to an outer housing of the sensor module so that the sensor module can be attached to the human body. If the sensor module is attached to the human body skin through the applicator according to this structure, a state that the sensor module is attached to the human body skin is maintained by the adhesive tape, and, the blood glucose is continuously measured in this state.

A plurality of electrode layers are formed at a portion of a sensor unit of the sensor module, which is inserted into the skin, in order to measure information regarding various substance from body fluid, and the plurality of electrode layers extend to a portion not being inserted into the skin to be connected to a separate electronic device through an electrical contact point.

Because a portion of the sensor unit inserted into the skin should maintain a state of being inserted to the skin for significant time period, it is formed to have a tiny shape of being very thin and having a narrow width. Like this, because the sensor unit is formed in a fine structure, it is difficult of forming a complex structure such as a plurality of electrode layers and a connection contact point connected with an external electrical contact point at the sensor unit, and there is a problem in that, because of a structure of a plurality of electrode layers, minimization of the size of the sensor unit is very limited. Additionally, there is a problem of increasing a defective rate of a product during a process of forming the structure of those electrode layers and connection contact points through a microprocessing process.

SUMMARY

Technical Problem

The present disclosure is invented to solve problems in conventional technique, and the purpose of the present disclosure is providing a sensor unit for continuous blood glucose measurement connecting an electrode layer formed on one surface of a circuit board with a sensor contact point portion of the other surface of the circuit board through one or more via holes, thereby being capable of connecting the electrode layer to the sensor contact point portion of the other surface of the circuit board without expanding a structure of the circuit board or additionally expanding a separate connection structure so as to simplify a structure, arranging two electrode layers on one and the other surfaces of the circuit board opposite to each other, respectively, without necessity of arranging two electrode layers on the same surface of the circuit board, and accordingly providing an overall minimized and simplified structure.

Another purpose of the present disclosure is providing a sensor unit for continuous blood glucose measurement forming an electrode connection layer formed at the via holes by depositing the electrode connection layer on an inside circumferential surface of the via holes instead of a structure of filling an electrode connection layer in the via holes, thereby preventing defection of filler caused during the process of filling the via holes and faulty of electrical connection due to this so as to achieve a more stable structure.

Still another purpose of the present disclosure is providing a sensor unit for continuous blood glucose measurement extending electrode connection layers of via holes to one surface and the other surface of a circuit board so that an electrode layer, a sensor contact point portion, and the electrode connection layer are mutually contacted in an overlapped way, and therefore the connection stability can be improved.

Still another purpose of the present disclosure is providing a sensor unit for continuous blood glucose measurement forming a plurality of via holes so that, even though any one of the electrode connection layers formed at the via holes is damaged or faulty, the electrical connection can be maintained by the electrode connection layers formed on the remaining via holes, thereby maintaining more stable performance.

Solution to Problem

A present disclosure provides a sensor unit for continuous blood glucose measurement of which one end portion is to be inserted into a human body, the sensor unit comprising: a circuit board, wherein one or more via holes are formed at one side portion of the circuit board; and a first electrode layer and a second electrode layer formed at one surface and an other surface of the circuit board, respectively, wherein a first sensor contact point portion and a second sensor contact point portion to be connected to external electrical contact points, respectively, are formed on the one surface of the circuit board, an electrode connection layer of conductive material is formed at an inside circumferential surface of the one or more via holes, and the second electrode layer is electrically connected to the second sensor contact point portion through the electrode connection layer.

At that time, the electrode connection layer extends from the inside circumferential surface of the one or more via holes to the one surface and the other surface of the circuit board and an area adjacent to the one or more via holes, the second electrode layer covers an end portion of the electrode connection layer at the other surface of the circuit board, and the second sensor contact point portion may cover the end portion of the electrode connection layer at the one surface of the circuit board.

Additionally, the electrode connection layer may be formed in a way of depositing conductive particles through a sputtering process.

Further, in a state that the electrode connection layer is deposited, the first electrode layer, the first sensor contact point portion and the second sensor contact point portion may be printed on the one surface of the circuit board, and the second electrode layer is printed on the other surface of the circuit board.

Additionally, the sensor unit for continuous blood glucose measurement may further comprise: a sensor body portion configured to contact one or more of the electrical contact points, and a sensor probe portion having a shape of being bent from one side of the sensor body portion and elongated in one direction to be inserted into the human body, wherein the circuit board forms the sensor body portion and the sensor probe portion, the first electrode layer and the second electrode layer are formed to extend from the sensor body portion to the sensor probe portion, and the first sensor contact point portion, the second sensor contact point portion, the one or more via holes, and the electrode connection layer are formed at the sensor body portion.

Further, a pressure transformable portion configured to be transformable in response to pressurizing manipulation of a user to be contacted to one or more of the electrical contact points is formed at the sensor body portion, the first sensor contact point portion is formed at one side of the pressure transformable portion, the first electrode layer has a trace shape at the sensor body portion and extends to the pressure transformable portion to be connected to the first sensor contact point portion, the one or more via holes and the second sensor contact point portion are formed at an other side of the pressure transformable portion, and the second electrode layer may have a trace shape at the sensor body portion and extends to the pressure transformable portion to be connected to the electrode connection layer of the one or more via holes and is connected to the second sensor contact point portion through the electrode connection layer.

Additionally, the pressure transformable portion may be formed to have a shape cut along a cut line formed at a center area of the sensor body portion.

Advantageous Effects of Invention

According to an embodiment of the present disclosure, by connecting an electrode layer formed on one surface of a circuit board with a sensor contact point portion of the other surface of the circuit board through one or more via holes, the electrode layer can be connected to the sensor contact point portion of the other surface of the circuit board without expanding a structure of the circuit board or additionally expanding a separate connection structure, and therefore a structure can be simplified, and therefore two electrode layers are arranged on one and the other surfaces of the circuit board opposite to each other, respectively, without necessity of arranging two electrode layers on the same surface of the circuit board, and accordingly an overall minimized and simplified structure may be provided.

By forming an electrode connection layer formed at the via holes by depositing the electrode connection layer on an inside circumferential surface of the via holes instead of a structure of filling an electrode connection layer in the via holes, defection of filler caused during the process of filling the via holes and faulty of electrical connection due to this can be prevented, and therefore a more stable structure can be achieved.

By extending electrode connection layers of via holes to one surface and the other surface of a circuit board, an electrode layer, a sensor contact point portion, and the electrode connection layer are mutually contacted in an overlapped way, and therefore the connection stability can be improved.

By forming a plurality of via holes, even though any one of the electrode connection layers formed at the via holes is damaged or faulty, the electrical connection can be maintained by the electrode connection layers formed on the remaining via holes, thereby maintaining more stable performance.

DETAILED DESCRIPTION OF EMBODIMENTS

Hereinafter, embodiments of the present disclosure will be described in detail with reference to the accompanying drawings. Throughout this document, reference should be made to the drawings, in which the same reference numerals and symbols will be used to designate the same or like components. Additionally, in the following description of the present disclosure, detailed descriptions of known functions and components incorporated herein will be omitted in the case that the subject matter of the present disclosure may be rendered unclear thereby.

Figure 1:
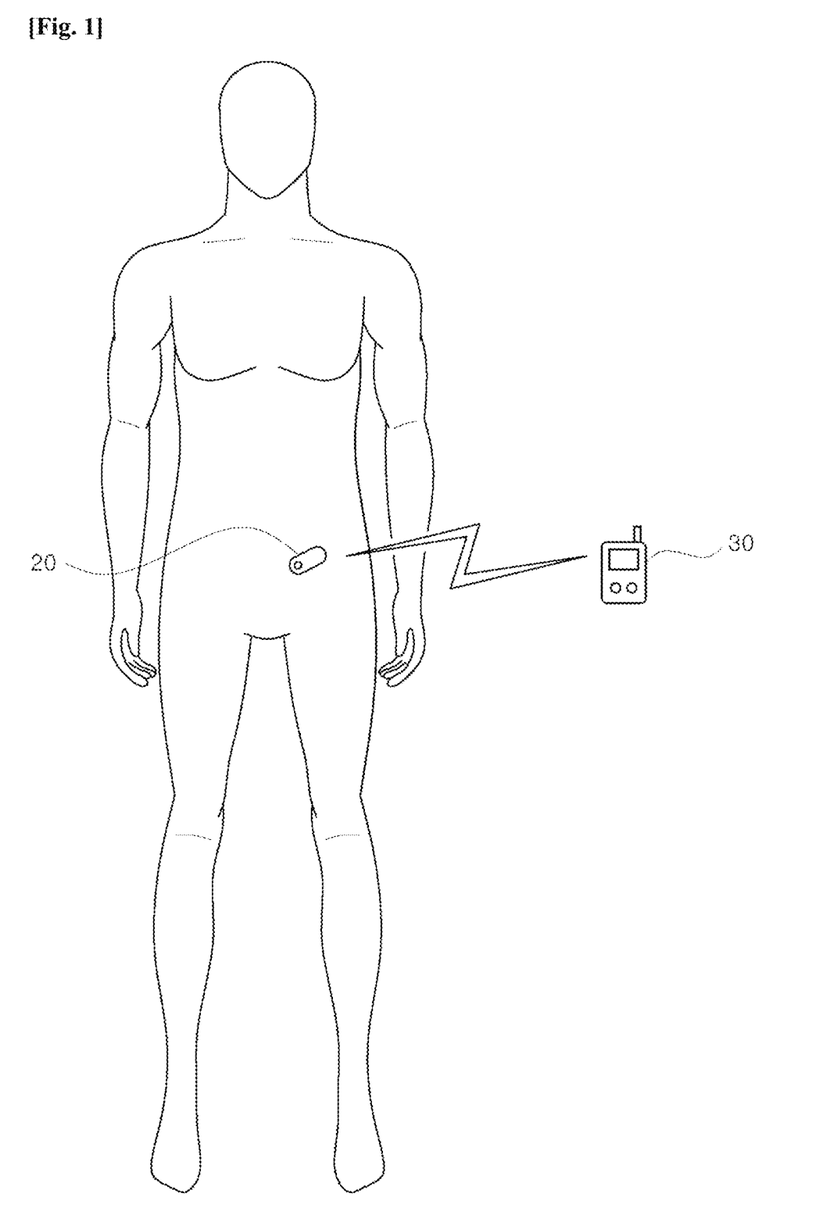
FIG. 1 is a figure of schematically illustrating a basic system of a continuous blood glucose monitoring device according to an embodiment of the present disclosure.
Figure 2:
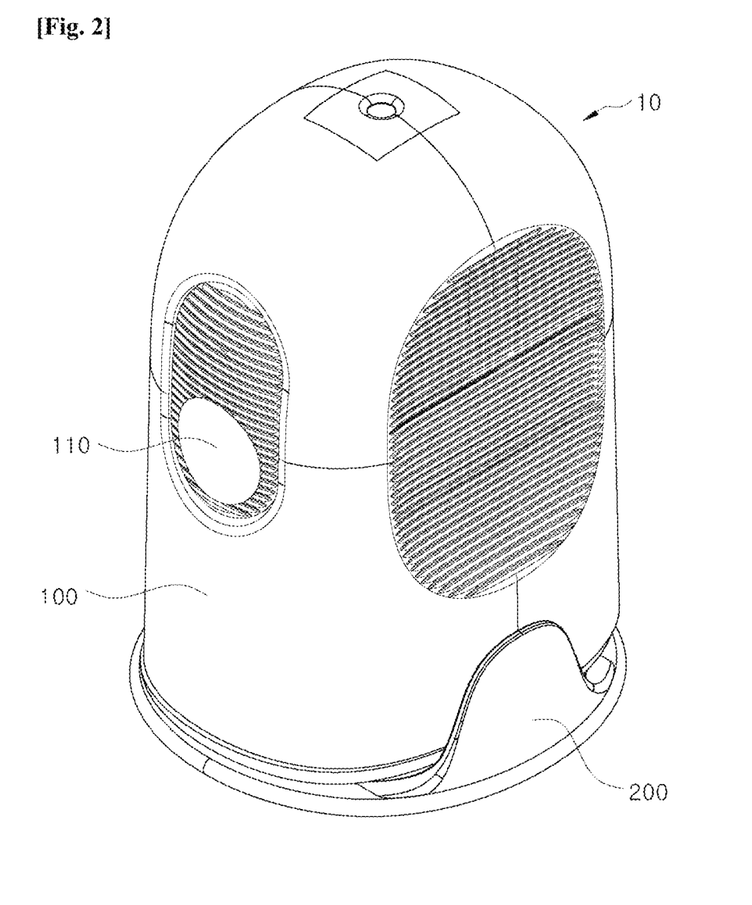
FIG. 2 is a figure for schematically illustrating a structure of an applicator of a continuous blood glucose monitoring device according to an embodiment of the present disclosure.
Figure 3:
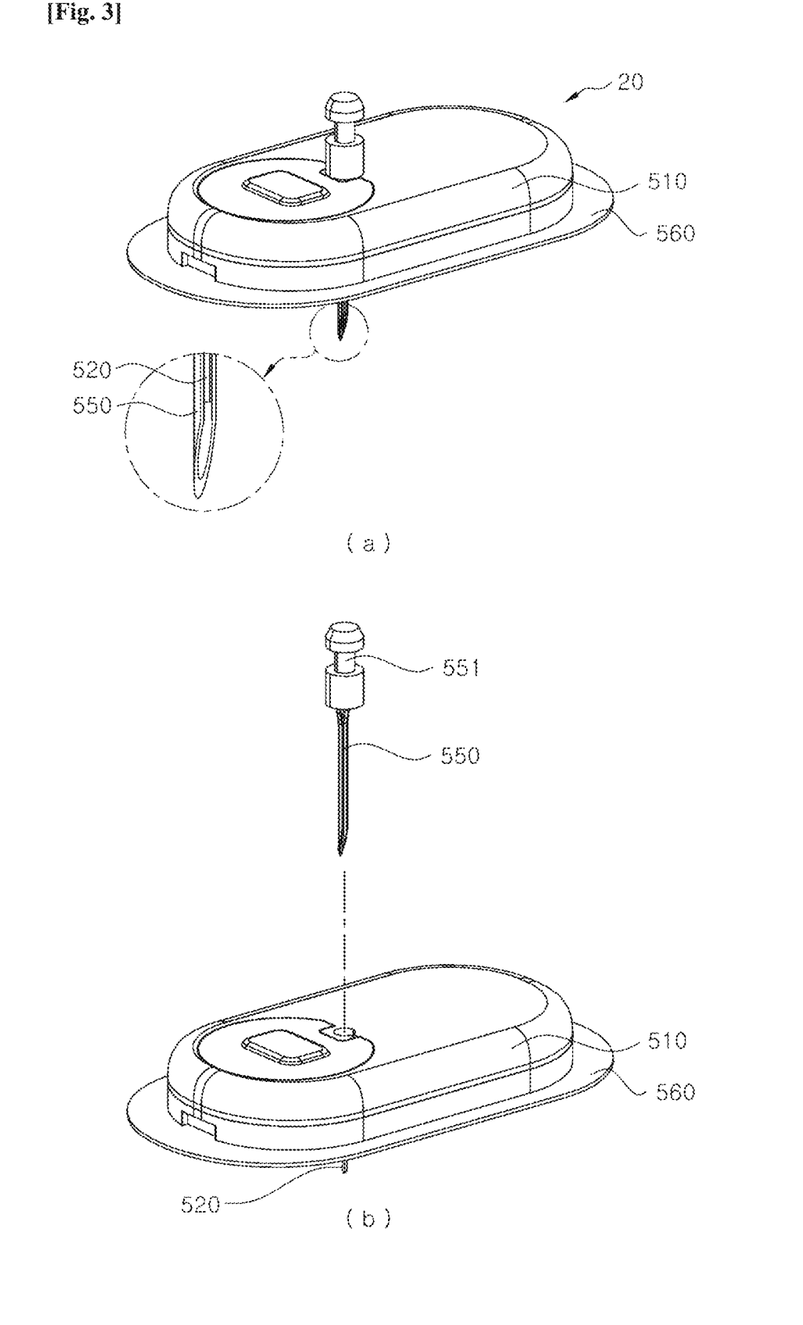
FIG. 3 is a figure of schematically illustrating a configuration of a body attachable unit of a continuous blood glucose monitoring device according to an embodiment of the present disclosure.

FIG. 1 is a figure of schematically illustrating a basic system of a continuous blood glucose monitoring device according to an embodiment of the present disclosure, FIG. 2 is a figure for schematically illustrating a structure of an applicator of a continuous blood glucose monitoring device according to an embodiment of the present disclosure, and FIG. 3 is a figure of schematically illustrating a configuration of a body attachable unit of a continuous blood glucose monitoring device according to an embodiment of the present disclosure.

A continuous blood glucose monitoring device according to an embodiment of the present disclosure is configured that a body attachable unit (20) including a sensor unit (520) inserted into the human body for continuous blood glucose measurement is configured to be attached to the human body through an applicator (10), the blood glucose can be continuously monitored by insertedly attaching the body attachable unit (20) to the human body by manipulating the applicator (20), and blood glucose information periodically measured by the body attachable unit (20) is transmitted to a terminal (30) to display it.

A continuous blood glucose monitoring apparatus may be manufactured as one single unit product by assembling a body attachable unit (20) into the inside of an applicator (10), and has a simpler structure which can be easily used by minimizing additional work of a user when using the continuous blood glucose monitoring apparatus.

The body attachable unit (20) may be configured to be attachable to a human body to periodically measure blood sugar level or glucose by extracting body fluid, and transmit the blood glucose measurement result to an external device such as an external terminal (30) and so on. A sensor unit (520) of which one end portion can be inserted into the human body and a wireless communication chip configured to wirelessly communicate with the external terminal (30) can be disposed inside the body attachable unit (20), and therefore, the body attachable unit (20) can be used without additional connection of a separate transmitter.

The applicator (10) is formed such that the body attachable unit (20) is fixedly coupled to inside of the applicator (10), and the applicator (10) is configured to outwardly discharge the body attachable unit (20) according to the manipulation of the user.

In this embodiment, the body attachable unit (20) is assembled and produced in a state that the body attachable unit (20) is inserted into the inside of the applicator (10), and is configured to move in an outward discharge direction pursuant to the operation of the applicator (10) by the manipulation of the user and be attached to the human body.

Therefore, the sensor applicator assembly according to an embodiment of the present disclosure is assembled and manufactured in a state that the body attachable unit (20) is inserted in the inside of the applicator (10) at the manufacturing stage and the body attachable unit (20) can be attached to a skin by only the operation of the applicator (10), and because the sensor applicator assembly (1) is supplied to the user in this state, the user can easily attach the body attachable unit (20) to the skin by only the manipulation simply activating the applicator (10) without extra additional operation for attaching the body attachable unit (20) to the skin. Specifically, since the body attachable unit (20) has the wireless communication chip (540), no connection with an extra transmitter is needed and therefore it can be used more conveniently.

In a conventional continuous blood glucose measurement apparatus, after removing a body attachable unit, which is separately packaged, precisely inserting it into an applicator, and then operating the applicator, the body attachable unit is attached to a skin, but the work precisely inserting the body attachable unit into the applicator is cumbersome as well as difficult and there is a problem in lowering the accuracy of blood glucose measurement because of contaminating the body attachable unit when young children or elderly adults perform this procedure.

In an embodiment of the present disclosure, at the manufacturing stage, it is manufactured and distributed in a state that the body attachable unit (20) is inserted in the applicator (10), and therefore the step that the user removes the body attachable unit (20) from the package and inserts it into the applicator (10) may be omitted, because the body attachable unit (20) can be attached to the skin by simply manipulating the applicator (10), the usability may be significantly improved, and specifically, the accuracy of blood glucose measurement may be improved by preventing the contamination of the body attachable unit (20).

A separate and additional protection cap (200) can be separably coupled to the applicator (10) in order to block external exposure in a state that the applicator (10) is inserted in the inside of the applicator (10), and it may be configured that the user can attach the body attachable unit (20) to the human body by manipulating the applicator (10) only after the protection cap (200) is separated.

In the embodiment of the present disclosure, an adhesive tape (560) is provided at a side of the body attachable unit (20) contacting the human body to be attached to the human body, to protect the adhesive tape (560), a release paper (not shown) is attached to a surface of the adhesive tape (560) contacting the human body, and the release paper of the adhesive tape (560) may be configured to be separated and removed from the adhesive tape (560) during the operation of separating the protection cap (200) from the applicator (10).

For example, the release paper of the adhesive tape (560) may be configured to adhere one side of the release paper to the protection cap (200), and therefore, if the user separates the protection cap (200) from the applicator (10), the release paper (560) may be separated and removed from the adhesive tape (560) together with the protection cap (200). Accordingly, if the user separates the protection cap (200), the release paper of the adhesive tape (560) is separated and removed, and therefore in this status the body attachable unit (20) can be attached to the human body by the operation of the applicator (10).

Additionally, in a state that the body attachable unit (20) is inserted in the inside, the applicator (10) fixes the body the attachable unit (20), and in a state that the body attachable unit (20) is outwardly discharged and moved, the applicator (10) is configured to release the fixed state of the body attachable unit (20). Accordingly, in a state that the body attachable unit (20) is assembled to be inserted in the inside of the applicator (10), the body attachable unit (20) maintains the fixed state, and when the body attachable unit (20) is externally discharged and attached to the skin by actuating the applicator (10), the state fixed between the applicator (10) and the body attachable unit (20) is released, and therefore if the applicator (10) is separated in this state the applicator (10) is separated from the body attachable unit (20) and only the body attachable unit (20) remains on the skin.

Meanwhile, the body attachable unit (20) according to an embodiment of the present disclosure is configured to cause the sensor unit (520) and the wireless communication chip to initiate their operations through a separate switching means controlled by the user. Accordingly, after inserting and attaching the body attachable unit (20) to the human body by using the applicator (10), the user may initiate to operate the body attachable unit (20) through the switching means or other appropriate means included in the body attachable unit (20), and from the time of the initiation of the operation the sensor unit (520) and the wireless communication chip may be operated, the blood glucose of the human body may be measured, and the measurement result may be transmitted to the external terminal. In this embodiment, the switching means operated by the user may be implemented in various ways.

Additionally, in the body attachable unit (20), the sensor unit (520) is disposed in a housing (510), and one end portion of the sensor unit (520) outwardly protrudes from the housing (510) so that it can be inserted and attached to the human body. The sensor unit (520) may comprise a sensor probe unit to be inserted into the human body, and a sensor body unit disposed inside the housing (510), and the sensor probe and the sensor body unit are formed as one end portion and another end portion of the sensor unit (520), respectively, and in a bent shape.

In this embodiment, in order to smoothly perform the body insertion process of the sensor unit (520), an insertion guide needle (550) may be separatably coupled to the housing (510). The insertion guide needle (550) may surround one end portion of the sensor unit (520) and be configured to be inserted together with the sensor unit (520)

into the human body so that one end portion of the sensor unit (520) can be stably inserted into the human body.

As shown in FIG. 3, the insertion guide needle (550) may be separatably coupled to the housing (510) in a direction penetrating the top and bottom of the housing (510) of the body attachable unit (20), the insertion guide needle (550) may be formed to have a structure covering the outside of the sensor unit (520), and a need head (551) is formed at the upper end portion of the needle unit (550). If the body attachable unit (20) is moved in the direction outwardly discharged by the applicator (10), the insertion guide needle (550) is inserted into the human body first before the sensor unit (520) is inserted into the human body and the insertion guide needle (550) may support the sensor unit (520) such that the sensor unit (520) can be stably inserted in the skin. The insertion guide needle (550) may be coupled with a needle extracting body (not shown) of the applicator (10) through the needle head (551), and after the body attachable unit (20) is inserted and attached to the human body by the operation of the applicator (10), the insertion guide needle (550) may be configured to be withdrew and removed from the human body by the needle extracting body of the applicator (10).

After the insertion guide needle (550) is extracted and removed from the human body, a state that the body attachable unit (20) is insertedly attached to the human body is maintained, and the sensor unit (520) of the body attachable unit (20) measures blood glucose information from body fluid in a state that its one end portion is inserted to the skin. For this blood glucose information measurement, a plurality of electrode layers are formed at the sensor unit (520), and each electrode layer is formed to be connected to an electric contact point of an external electronic device.

Hereinafter, a sensor unit according to an embodiment of the present disclosure will be described in further details.

Figure 4:
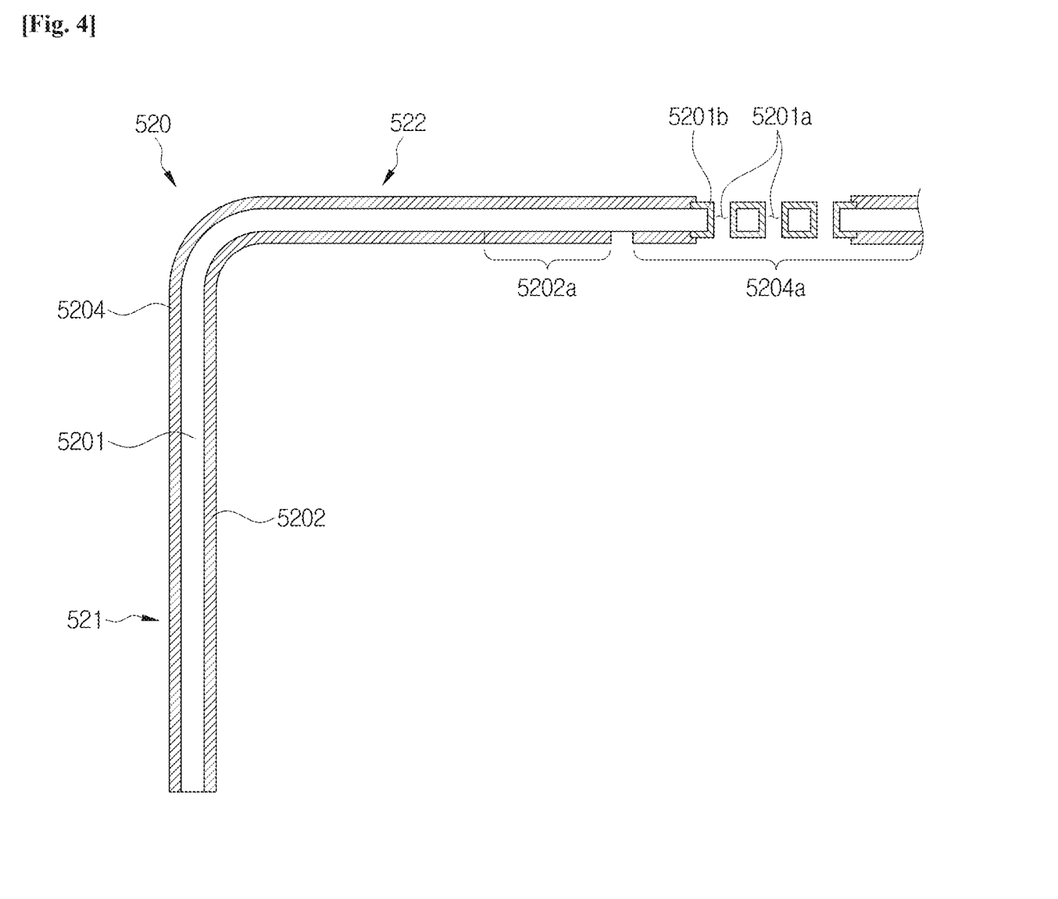
FIG. 4 is a figure for schematically illustrating an electrode formation structure of a sensor unit according to an embodiment of the present disclosure.

FIG. 4 is a figure for schematically illustrating an electrode formation structure of a sensor unit according to an embodiment of the present disclosure.

The sensor unit (520) according to an embodiment of the present disclosure is configured to have a sensor body portion (522) having a flat plate shape, and a sensor probe portion (521) having a shape of being bent from one side of the sensor body portion (522) and elongated in one direction for being inserted into the human body, and is configured to comprise a circuit board (5201) forming the sensor body portion (522) and the sensor probe portion (521), and a first electrode layer (5202) and a second electrode layer (5204) formed at one side and the other side of the circuit board (5201).

The first electrode layer (5202) and the second electrode layer (5204) function as a operation electrode and a counter electrode, respectively, and therefore are configured to measure blood glucose information from body fluid, and because the blood glucose information measurement way and principle through the operation electrode and the counter electrode are the known conventional art, their detailed descriptions are omitted.

A first sensor contact point portion (5202*a*) and a second sensor contact point portion (5204*a*) are formed at one surface of the board circuit (520) so that the first electrode layer (5202) and the second electrode layer (5204) can be connected to a respective separate external electrical contact point. Additionally, a via hole (5201*a*) is formed at one side of the circuit board (5201), an electrode connection layer (5201*b*) having conductive material is formed at an inside circumferential surface of the via hole (5201*a*), and the second electrode layer (5204) formed at the other surface of the circuit board (5201) is electrically connected with the second sensor contact point portion (5204*a*) through the electrode connection layer (5201*b*) of the via hole (5201*a*).

Accordingly, the first electrode layer (5202) is formed at one surface of the circuit board (5201), the second electrode layer (5204) is formed at the other surface of the circuit board (5201), the first sensor contact point portion (5202*a*) and the second sensor contact point portion (5204*a*) are formed at one surface of the circuit board (5201), the first sensor contact point portion (5202*a*) is directly connected to the first electrode layer (5202) formed at one surface of the circuit board (5201), and the second sensor contact point portion (5204*a*) is connected to the second electrode layer (5204), formed on the other surface of the circuit board (5201), through the electrode connection layer (5201*b*). At that embodiment, the electrode connection layer (5201*b*) is formed at the inside circumferential surface of the via hole (5201*a*) penetrating through the circuit board (5201).

According to such a structure, the second electrode layer (5204) formed on the other surface of the ccc is connected with the second sensor contact point portion (5204*a*) formed on one surface of the circuit board (5201) through the electrode connection layer (5201*b*) using the via hole (5201*a*), thereby connecting the second electrode layer (5204) to the second sensor contact point portion (5204*a*) without extending the structure of the circuit board (5201) or additionally extending a separate connection structure, and therefore because the first electrode layer (5202) and the second electrode layer (5204) do not need to be formed on the same surface of the circuit board (5201), the first electrode layer (5202) and the second electrode layer (5204) can be formed at surfaces opposite to each other, respectively, thereby minimizing an overall width of the circuit board (5201).

Additionally, the electrode connection layer (5201*b*) is not formed in a structure of filling the via hole (5201*a*) penetrating through the ccc, but, as illustrated in FIG. 4, the electrode connection layer (5201*b*) is formed in a structure of being deposited on the inside circumferential surface of the via hole (5201*a*) without filing the via hole (5201*a*) so that the via hole (5201*a*) can be kept as it is.

As described above, because the electrode connection layer (5201*b*) is not formed in a structure of filling the via hole (5201*a*) but is formed on the inside surface of the via hole (5201*a*), the defection of the filler caused during the process of filling the via hole (5201*a*) and the faulty of electrical connection due to this can be prevented, thereby forming a more stable structure.

Additionally, the electrode connection layer (5201*b*) is formed to extend from the inside circumferential surface of the via hole (5201*a*) to a area adjacent to the via hole (5201*a*) of one and the other surfaces of the circuit board (5201), and the second electrode layer (5204) is formed in a structure of covering one end portion of the electrode connection layer (5201*b*) at the other surface of the circuit board (5201) to be connected to the electrode connection layer (5201*b*), and the second sensor contact point portion (5204*a*) is formed in a structure of covering one end portion of the electrode connection layer (5201*b*) at one surface of the ccc to be connected to the electrode connection layer (5201*b*).

Like this, by forming to extend to one surface area and the other surface area of the circuit board (5201), the second electrode layer (5204), the second sensor contact point portion (5204*a*) and the electrode connection layer (5201*b*) are mutually overlapped and contacted, and therefore the contact stability is more improved.

Additionally, as illustrated in FIG. 4, the plurality of via holes (5201a) can be formed at the circuit board (5201), and the electrode connection layer (5201b) is formed at each of the plurality of the via holes (5201a) in the same way, thereby connecting between the second electrode layer (5204) and the second sensor contact point portion (5204a), and therefore, even though any one of the electrode connection layers (5201b) formed at the via holes (5201a) is damaged or faulty, the electrical connection can be maintained by the electrode connection layers (5201b) formed on the remaining via holes (5201a), thereby maintaining more stable performance.

The electrode connection layer (5201b) may be formed in a way of depositing conductive particles, for example, metal particles such as Au and Ag, on the inside circumferential surface of the via hole (5201a) and its adjacent area by a sputtering process.

Like this, in a state of depositedly forming the electrode connection layer (5201b), the first electrode layer (5202), the first sensor contact point portion (5202a) and the second contact point portion (5204a) are formed at one surface of the ccc through a print process of conductive paste containing conductive particles, and, likewise, the second electrode layer (5204) can be formed at the other surface of the circuit board (5201) through the print process of the connective paste.

Figure 5:
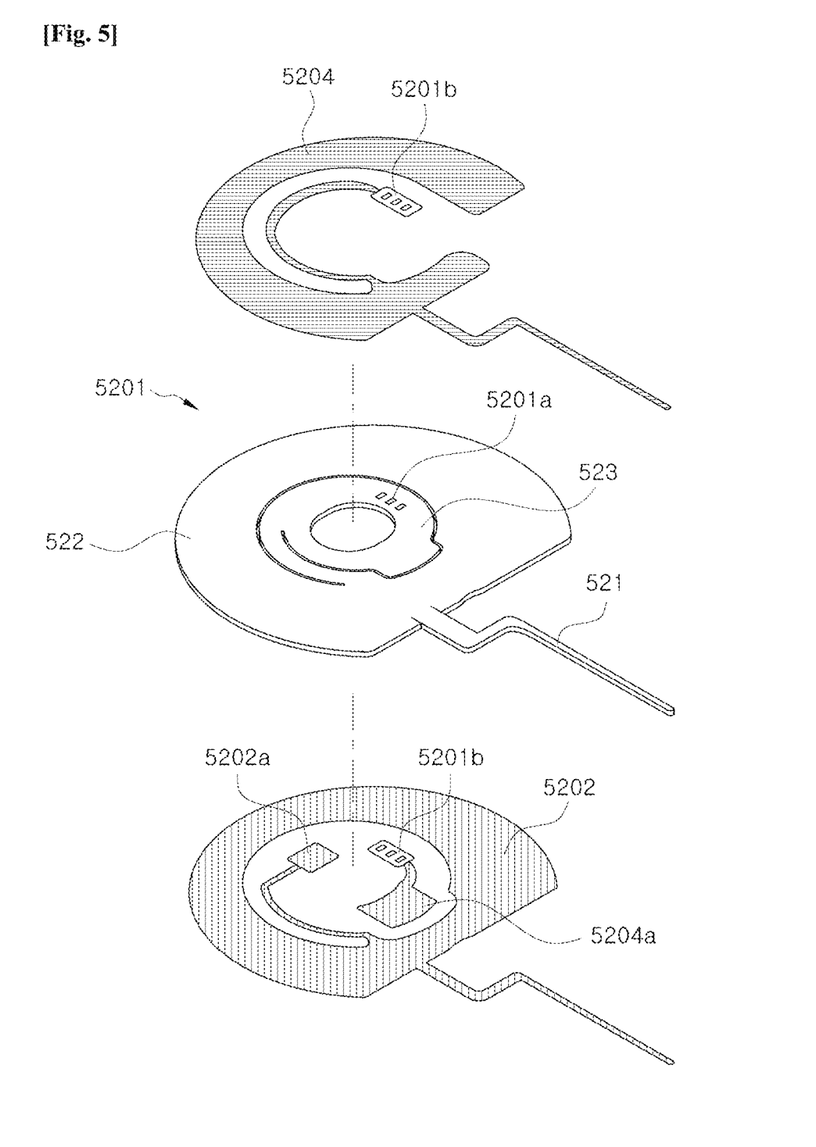
FIGS. 5 and 6 are figures for illustrating structures of electrode layers formed at a sensor unit according to an embodiment of the present disclosure.
Figure 6:
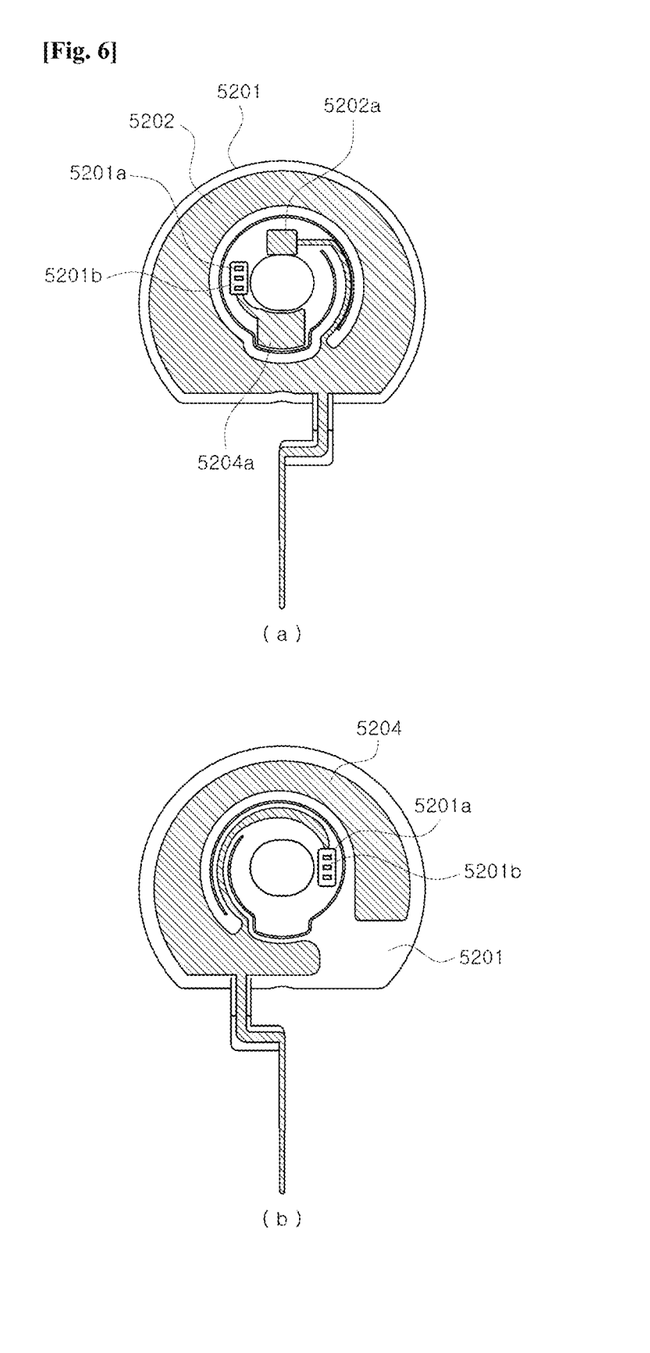

FIGS. 5 and 6 are figures for illustrating structures of electrode layers formed at a sensor unit according to an embodiment of the present disclosure.

A specifically implemented actual exemplary embodiment of the structures related to the electrode layers of the sensor unit (520) conceptually described in FIG. 4 is illustrated in FIGS. 5 and 6.

As illustrated in FIGS. 5 and 6, the sensor body portion (522) formed to be connected to a separate external electrical contact point, and the sensor probe portion (521) having a shape of being bent from one side of the sensor body portion (522) and elongated in one direction for being inserted into the human body are formed at the sensor unit (520). The sensor probe portion (521) illustrated in FIGS. 5 and 6 is positioned at the same plane as the sensor body portion (522), but this is for ease of illustrating the electrode layers described below, and after the formation of the electrode layers is completed, the sensor probe portion (520) is formed to be bent to be perpendicular to the sensor body portion (522) (See FIG. 9).

The ccc forms a basic structure of the sensor unit (520) and is formed to form the sensor body portion (522) and the sensor probe portion (521), the first electrode layer (5202) and the second electrode layer (5204) are formed to extend from the sensor body portion (522) area to the sensor probe portion (521) area, and the first sensor contact point portion (5202a), the second sensor contact point portion (5204a), the via hole (5201a) and the electrode connection layer (5201b) are formed at the sensor body portion (522) area.

Such a sensor unit (520) is configured to be in a way of being operated by being connected to an electrical contact point by a switch means as described above, and, for this, the sensor body portion (522) is formed in a shape of plate, and a pressure transformable portion (523) contacting an external electrical contact point by being transformed by the pressurizing manipulation of the user can be formed at the center portion of the sensor unit (520). The pressure transformable portion (523) is formed in a shape of being cut along a cut line (CL) formed at the center area of the sensor body portion (522), and the cut line (CL) can be formed in a spiral shape.

As illustrated in FIGS. 5 and 6(a), at one surface of the circuit board (5201), the first electrode layer (5202) is formed to extend to the sensor body portion (522) and the sensor probe portion (521), and, as illustrated in FIGS. 5 and 6(b), at the other surface of the circuit board (5201), the second electrode layer (5204) is formed to extend to the sensor body portion (522) and the sensor probe portion (521).

The first sensor contact point portion (5202a) is formed at one surface of the circuit board (5201) and at one side of the pressure transformable portion (523) area, the first electrode layer (5202) is in a trace structure at an outer area of the sensor body portion (522) and is extended to the pressure transformable portion (523) so that the first electrode layer (5202) can be connected with the first sensor contact point portion (5202a). The trace extended from the first electrode layer (5202) to the first sensor contact point portion (5202a) is formed in a structure of not crossing with the cut line (CL) of the pressure transformable portion (523).

The via hole (5201a) is formed at the other side of the pressure transformable portion (523) area, and the second sensor contact point portion (5204a) is formed at one surface of the circuit board (5201) and at the other side of the pressure transformable portion (523) area. The electrode connection layer (5201b) formed at the via hole (5201a) is formed to extend to one surface and the other surface of the circuit board (5201), and is connected in a contact manner in way of being overlapped with the second sensor contact point portion (5204a) at one surface of the circuit board (5201). The second electrode layer (5204) is extended to the pressure transformable portion (523) in a trance structure at the outer area of the sensor body portion (522) and is connected in a contact manner in a way of being overlapped with the electrode connection layer (5201b) at the other surface of the circuit board (5201). In this way, the second electrode layer (5204) formed at the other surface of the circuit board (5201) is connected to the second sensor contact point portion (5204a) formed at one surface of the circuit board (5201) through the electrode connection layer (5201b). The trace extended from the second electrode layer (5204) to the electrode connection layer (5201b) is formed in a structure of not crossing with the cut line (CL) of the pressure transformable portion (523).

Meanwhile, a cross-sectional shape of the via hole (5201a) can be formed in various shapes, such as a circle shape, a star shape, a squire shape, and so on, and its inside diameter also can be adjusted with various sizes according to the need of the user.

The structure of the sensor unit according to an embodiment of the present disclosure is described above, and configurations of the body attachable unit (20) to which the sensor unit is applied will be described below.

Figure 7:
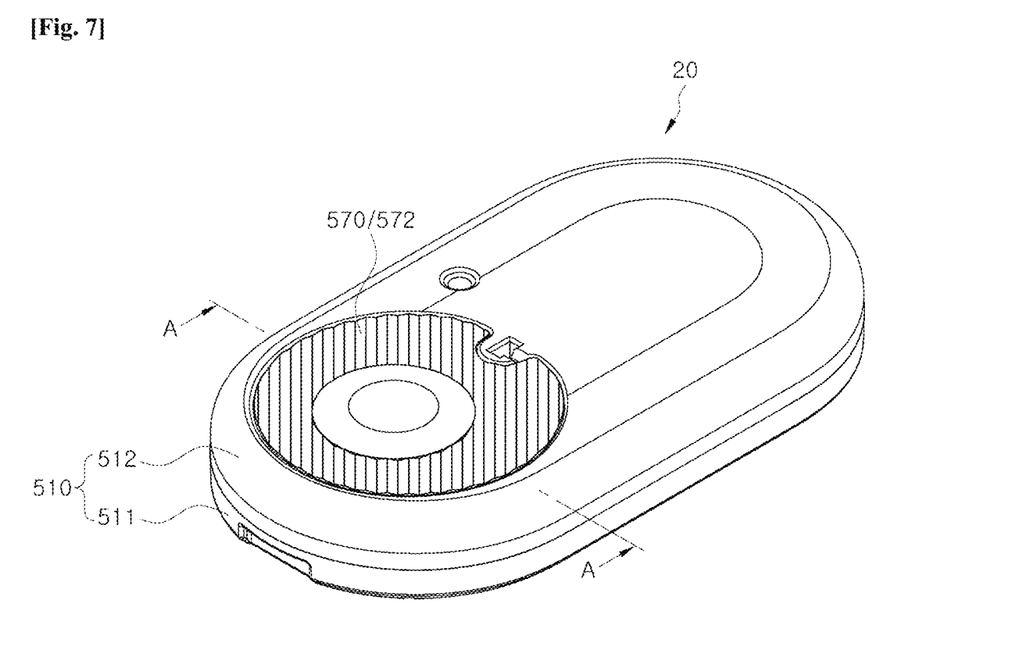
FIG. 7 is a perspective view conceptually illustrating an outer structure of a body attachable unit attached to a human body according to an embodiment of the present disclosure.
Figure 8:
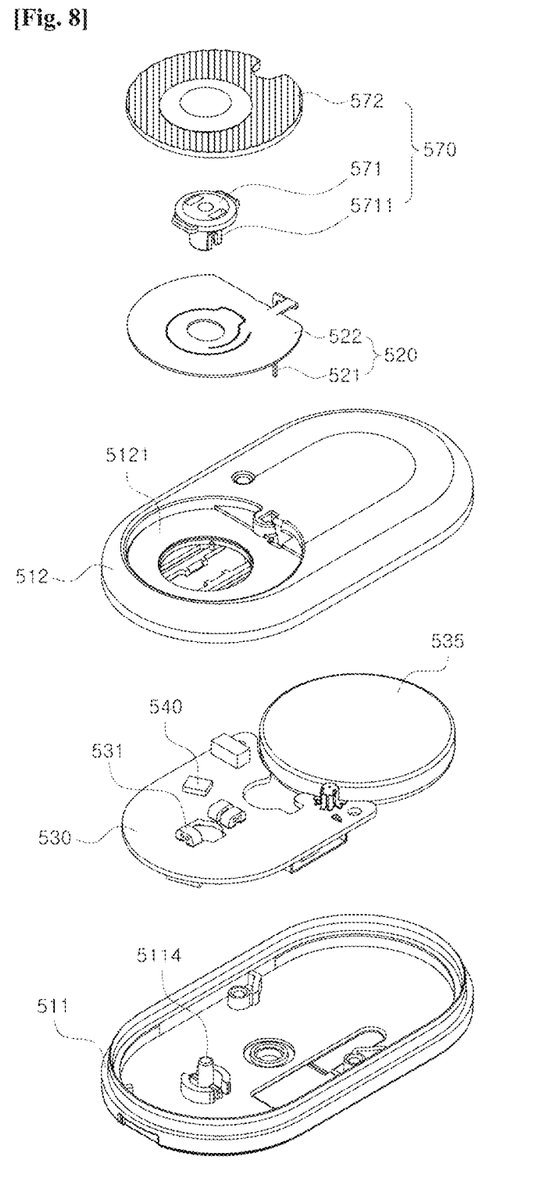
FIG. 8 is an exploded perspective view conceptually illustrating components of a body attachable unit.
Figure 9:
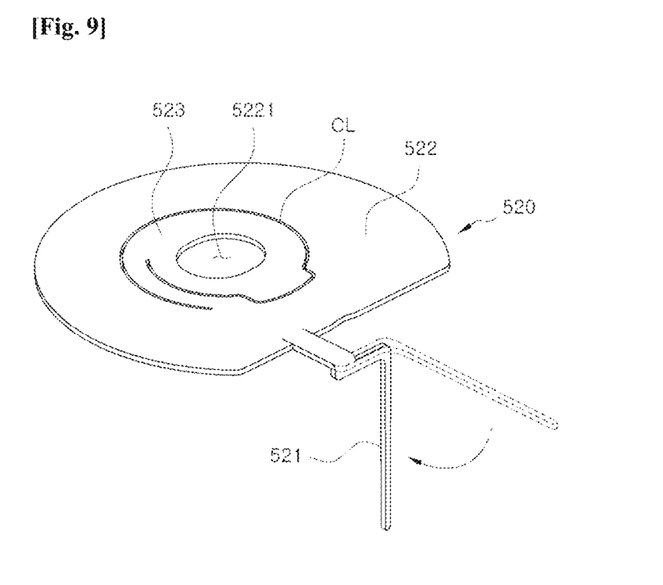
FIG. 9 is a perspective view conceptually illustrating a structure of a sensor unit according to an embodiment of the present disclosure.
Figure 10:
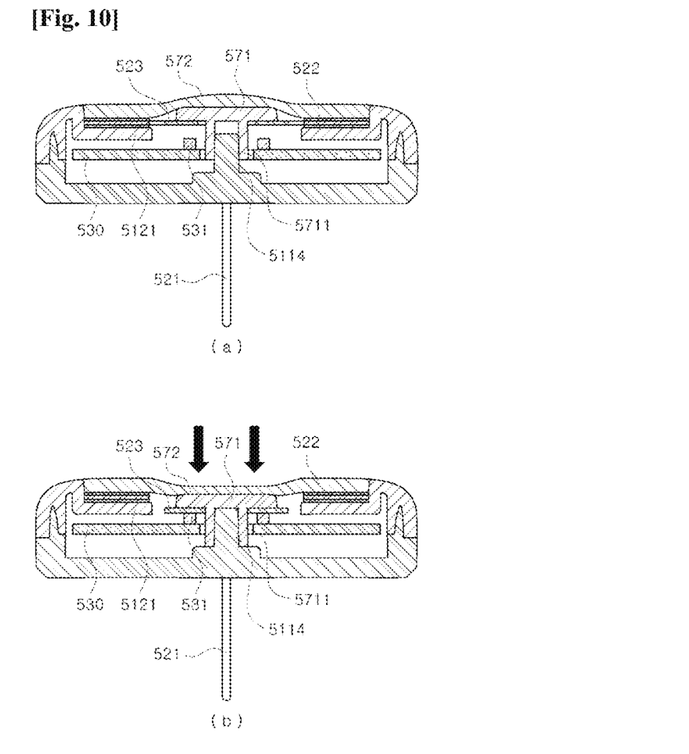
FIG. 10 is a figure for conceptually illustrating an operation state of a body attachable unit with reference to a cross-section taken along line "A-A" of FIG. 7 according to an embodiment of the present disclosure.

FIG. 7 is a perspective view conceptually illustrating an outer structure of a body attachable unit attached to a human body according to an embodiment of the present disclosure, FIG. 8 is an exploded perspective view conceptually illustrating components of a body attachable unit, FIG. 9 is a perspective view conceptually illustrating a structure of a sensor unit according to an embodiment of the present disclosure, and FIG. 10 is a figure for conceptually illustrating an operation state of a body attachable unit with reference to a cross-section taken along line "A-A" of FIG. 7 according to an embodiment of the present disclosure.

The body attachable unit (20) according to an embodiment of the present disclosure is outwardly discharged according to the operation of the applicator, thereby being attached to the human body, and configured to comprise the housing (510) to which an adhesive tape is attached so that a bottom side of the housing (510) can be attached to the skin, the sensor unit (520) disposed inside the housing (510) such that one end portion of the sensor unit (520) externally protrudes from the bottom side of the housing (10) and is inserted into the human body when the housing (510) is attached to the skin, and a PCB board (530) arranged inside the housing (510).

One end portion of the sensor unit (520) is formed to be inserted into the human body and the other end portion of the sensor unit (520) is formed to contact the PCB board (530), a sensor body unit (522) is formed at the other end of the sensor unit (520) to be contacted with an electrical contact point of the PCB board (530), and a sensor probe unit (521) is formed at the one end portion and the sensor probe unit (521) is formed to extend in the form of being bent from one side of the sensor body unit (522) and outwardly protrudes from the housing (510) and is inserted into the human body. The sensor body unit (522) is formed to have a structure with a relatively large area, and the sensor probe unit (521) is formed to have a relatively narrow and long structure.

The housing (510) may be formed to be divided into a upper housing (512) and a lower housing (511) to form an inner accommodating space, a sensor supporting unit (5121) supporting the sensor body unit (522) to be spaced apart from the electrical contact point (531) of the PCB board (530) at a certain distance is formed inside the housing (510), and a sensor guide unit (not shown) configured to support and guide a certain section of the sensor probe unit (521) is also formed inside the housing (510). Additionally, a board supporting unit for fixedly supporting the PCB board (530) at a certain location may be also formed inside the housing (510).

The electrical contact point (531) is formed at the PCB board (530) to be electrically connected with the sensor unit (520), and the wireless communication chip (540) is installed to the PCB board (530) to transmit the glucose measurement result measured by the sensor unit (520) to an external terminal. According to an embodiment of the present disclosure, by installing the wireless communication chip (540) at the inside of the body attachable unit (20), the communication with the external terminal can be easily performed without a work connecting a separate transmitter.

Further, a battery (535) configured to supply power to the PCB board (530) is installed at the inside of the housing (510), and the battery (535) is not installed at one side of the PCB board (530) but disposed at an area independent from the PCB board (530). Accordingly, the PCB board (530) and the battery (535) are independently arranged so that any area of the PCB board (530) and the battery (535) projecting into the bottom surface of the housing (530) cannot overlap each other. By arranging the PCB board (530) and the battery (535) to areas independent to each other, respectively, the thickness of the body attachable unit (20) may be reduced and the size of the body attachable unit (20) may be more minimized. In this embodiment, at the PCB board (530), a separate contact terminal (532) may be formed to extend to the battery (535) to be electrically contacted and connected to the battery (535).

The body attachable unit (20) according to an embodiment of the present disclosure is formed so that the other end portion of the sensor unit (520), i.e., the sensor body unit (522), is contacted to the electrical contact point (531) of the PCB board (530) by the manipulation or operation of the user, and according to this electrical contact, the operation of the body attachable unit (20) may be initiated. Accordingly, the embodiment of the present embodiment is configured to perform the power supply as well as the initiation of the operation of the sensor unit (520), the wireless communication chip (540) and other components by the electrical connection of the sensor unit (520) and the PCB board (530) by the manipulation of the user.

The housing (510) may have a separate pressurizing operation module (570) activated by the operation of the user to connect the other end portion of the sensor unit (520) and the electrical contact point (531) of the PCB board (530) by the operation of the user.

The pressurizing operation module (570) is movably connected to the housing (510) and may comprise a movable pressurizing body (571) configured to be movable in a pressurizing direction by the pressure applied by the user, and according to the movement of the movable pressurizing body (571) at least a partial area of the other end portion of the sensor unit (520) is transformed by the pressure of the movable pressurizing body (571) and contacted to the electrical contact point (531) of the PCB board (530).

A protruding guide unit (5711) protruding along a movement direction of the movable pressurizing body (571) is formed at the movable pressurizing body (571), and a housing guide unit (5114) configured to guide the protruding guide unit (5711) and guide in the pressurizing movement direction of the movable pressurizing body (571) can be formed at the housing (510).

Additionally, the pressurizing operation module (570) may further comprises a button cover (572) having flexible material and a structure covering an outer surface of the movable pressurizing body (571) and coupled to the housing (510) so that the button cover (572) can be exposed to the outside of the body attachable unit (20) in order to be capable of the pressurizing operation by the user, and the coupling portion between the button cover (572) and the housing (510) may be processed to be sealed.

In this embodiment, the seal processing means at the coupling portion between the button cover (572) and the housing (510) may be configured to use a double-side tape. For example, one side of the double-side tape is adhered to the other portion of the sensor unit (520), such as one side of the sensor body unit (522), along its circumferential edge, the other side of the double-side tape is adhered to the inner-side surface of the button cover (572) along its circumferential edge, and this double-side tape can seal the circumferential edge of the button cover (572). In this embodiment, the double-side tape may be adhered to the other side of the sensor body unit (522) along the circumferential edge as well, and by this, the sensor body unit (522) may be adhered and fixed to the sensor supporting unit (5121) along the circumferential edge of the sensor body unit (522) by using the double-side tape.

In a state that the circumferential edge of the sensor body (522) is adhered and fixed to the sensor supporting unit (5121), the center section of the sensor body unit (522) is transformed by the pressure of the movable pressurizing body (571) and may contact the electrical contact point of the PCB board (530) as illustrated in FIG. 10. Although the movable pressurizing body (571) is moved in the pressurized direction, because the button cover (572) is made of flexible material and the circumferential edge portion of the button cover (572) is adhered to the housing (510) by the double-side tape (580), only the center portion of the button cover (572) is transformed in the pressurized direction and the circumferential edge portion of the button cover (572) is adheredly fixed and remains the sealed state.

Additionally, it is preferred that after the sensor body unit (522) is contacted to the electrical contact point (531) of the PCB board (530) by the operation of the user the contact status can be stably maintained for stable measurement of blood glucose, and for this, the movable pressurizing body (571) is formed to be fixedly positioned in a state that the movable pressurizing body (571) is moved in a pressurized direction by the urging force.

Meanwhile, the sensor unit (520) may consist of the sensor body unit (522) and the sensor probe unit (521) as described above, and a pressure transforming unit (523) configured to be transformed by the pressurizing movement of the movable pressurizing body (571) and contacted to the electric contact point (531) of the PCB board (530) may be formed at the sensor body unit (522).

As illustrated in FIG. 9, the pressure transforming unit (523) is formed to have a structure cut along a cut line (CL) formed at the center section of the sensor body unit (522), and can be formed to be transformable by the pressure applied by the movable pressurizing body (571).

If the movable pressurizing body (571) is manipulated or operated by the pressure according to the structure described above, the pressure transforming unit (523) formed along the cut line (CL) as illustrated in FIGS. 10 (*a*) and (*b*) is downwardly elastically transformed, thereby contacting the electric contact point (531) of the PCB board (530).

At that time, the first sensor contact point portion (5202*a*) and the second contact point portion (5204*a*) described with respect to FIGS. 4 to 6 are formed at the pressure transformable portion (523), and, in a state that the pressure transformable portion (523) is downwardly transformed, the first sensor contact point portion (5202*a*) and the second contact point portion (5204*a*) contact the electrical contact point (531) of the PCB circuit board (530). Accordingly, the first electrode layer (5202) and the second electrode layer (5204) formed at the sensor unit (520) are electrically connected to the electrical contact point (531) of the PCB circuit board (530).

The foregoing descriptions have been presented in order to explain certain principles of the present disclosure by way of example, and a person having ordinary skill in the art which the present disclosure relates could make various modifications and variations without departing from the essential features of the present disclosure. Accordingly, the foregoing embodiments disclosed in the present disclosure shall be interpreted as being illustrative, while not being limitative, of the principle and scope of the present disclosure. It should be understood that the scope of the present disclosure shall be defined by the Claims and all of their equivalents fall within the scope of the present disclosure.

What is claimed is:

1. A sensor unit comprising:
    a circuit board, wherein one or more via holes are formed at one side portion of the circuit board to penetrate the circuit board in a thickness direction; and
    a first electrode layer and a second electrode layer formed at one surface and an other surface of the circuit board, respectively,
    wherein a first sensor contact point portion and a second sensor contact point portion to be connected to external electrical contact points, respectively, are formed on the one surface of the circuit board,
    an electrode connection layer of conductive material is placed on at least one side of the circuit board forming the one or more via holes, and the electrode connection layer extends from an inside of the one or more via holes to the one surface and the other surface of the circuit board,
    an end portion of the second electrode layer covers an end portion of the electrode connection layer at the other surface of the circuit board, so that the end portion of the second electrode layer overlaps with the end portion of the electrode connection layer, an end portion of the second sensor contact point portion covers an end portion of the electrode connection layer at the one surface of the circuit board, so that the end portion of the second sensor contact point portion overlaps the end portion of the electrode connection layer, and the second electrode layer is electrically connected to the second sensor contact point portion through the electrode connection layer, and
    an air gap extending fully through the thickness direction of the circuit board is provided in the one or more via holes where the electrode connection layer is placed.

2. The sensor unit according to claim 1, wherein:
    the electrode connection layer extends to an area adjacent to the one or more via holes in which the electrode connection layer is placed.

3. The sensor unit according to claim 2, wherein the electrode connection layer is formed in a way of depositing conductive particles through a sputtering process.

4. The sensor unit according to claim 3, wherein, in a state that the electrode connection layer is deposited, the first electrode layer, the first sensor contact point portion and the second sensor contact point portion are printed on the one surface of the circuit board, and the second electrode layer is printed on the other surface of the circuit board.

5. The sensor unit according to claim 1, further comprising:
    a sensor body portion configured to contact one or more of the electrical contact points, and
    a sensor probe portion having a shape of being bent from one side of the sensor body portion and elongated in one direction to be inserted into the human body, wherein the circuit board forms the sensor body portion and the sensor probe portion,
    the first electrode layer and the second electrode layer are formed to extend from the sensor body portion to the sensor probe portion, and
    the first sensor contact point portion, the second sensor contact point portion, the one or more via holes, and the electrode connection layer are formed at the sensor body portion.

6. The sensor unit according to claim 5, wherein:
    a pressure transformable portion configured to be transformable in response to pressurizing manipulation of a user to be contacted to one or more of the electrical contact points is formed at the sensor body portion,
    the first sensor contact point portion is formed at one side of the pressure transformable portion,
    the first electrode layer has a trace shape at the sensor body portion and extends to the pressure transformable portion to be connected to the first sensor contact point portion, the one or more via holes and the second sensor contact point portion are formed at an other side of the pressure transformable portion, and
    the second electrode layer has a trace shape at the sensor body portion and extends to the pressure transformable portion to be connected to the electrode connection layer of the one or more via holes and is connected to the second sensor contact point portion through the electrode connection layer.

7. The sensor unit according to claim 6, wherein the pressure transformable portion is formed to have a shape cut along a cut line formed at a center area of the sensor body portion.

* * * * *